United States Patent [19]

Lapeyre

[11] 4,166,383

[45] Sep. 4, 1979

[54] OPTICAL SHAFT TORQUE METER

[75] Inventor: James M. Lapeyre, New Orleans, La.

[73] Assignee: The Laitram Corporation, New Orleans, La.

[21] Appl. No.: 888,480

[22] Filed: Mar. 20, 1978

[51] Int. Cl.² .............................................. G01L 3/12
[52] U.S. Cl. .................................................. 73/136 A
[58] Field of Search ............. 73/136 A, 136 B, 136 C; 116/129 AB

[56] References Cited

U.S. PATENT DOCUMENTS

| 2,519,378 | 8/1950 | Kilpatrick | 73/136 A |
| 2,811,853 | 11/1957 | Friedman | 73/136 A |

FOREIGN PATENT DOCUMENTS 28634 of 1907 United Kingdom ................... 73/136 A

*Primary Examiner*—Charles A. Ruehl
*Attorney, Agent, or Firm*—Weingarten, Maxham & Schurgin

[57] ABSTRACT

A torque meter for a rotating or stationary shaft and capable of providing a visual or electrical output indication of applied torque. An aperture is provided with respect to which a shaft is rotatable, the aperture being angled with respect to an axial marker on the shaft. In the presence of an applied torque to the shaft, the marker moves axially by an amount which is magnified in relation to the amount of twist and sensible through the aperture to produce an indication of the amount of applied torque.

6 Claims, 4 Drawing Figures

OPTICAL SHAFT TORQUE METER

FIELD OF THE INVENTION

This invention relates to torque measurement and more particularly to apparatus for the optical or electro-optical measurement of torque on a rotating or stationary shaft.

BACKGROUND OF THE INVENTION

It is often required to measure the torque in a shaft. For example, in the marine propulsion field it would be useful to know the shaft torque and shaft horsepower actually delivered to a propeller irrespective of engine speed. The applied torque gives rise to a circumferential twist on the shaft, the amount of twist being quite small and often difficult to measure. Stain gages are often employed on a shaft to produce an electrical signal which can be processed to provide an indication of torque. For a rotating shaft, however, the attachment of strain gages or other transducers is complicated by the necessity for coupling signals derived from the torqued shaft to external processing circuits.

SUMMARY OF THE INVENTION

In accordance with the present invention a torque meter is provided which is of very simple construction and which produces an output indication of the torque on a shaft which may be rotating or stationary. The output indication of shaft torque can be provided in electrical signal form for driving any suitable output indicating device, and can also be visually perceivable to an observer for direct visual indication of torque. An aperture is provided with respect to which a shaft is rotatable, the aperture being angled or skewed with respect to the shaft axis. An axial marker is provided on the shaft, a portion being visible through the aperture. In the presence of an applied torque to the shaft, the circumferential movement of the marker is magnified into an axial movement sensible via the aperture. The axial movement of the marker is a measure of applied torque and can be visually or electro-optically sensible to yield an output indication of torque.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
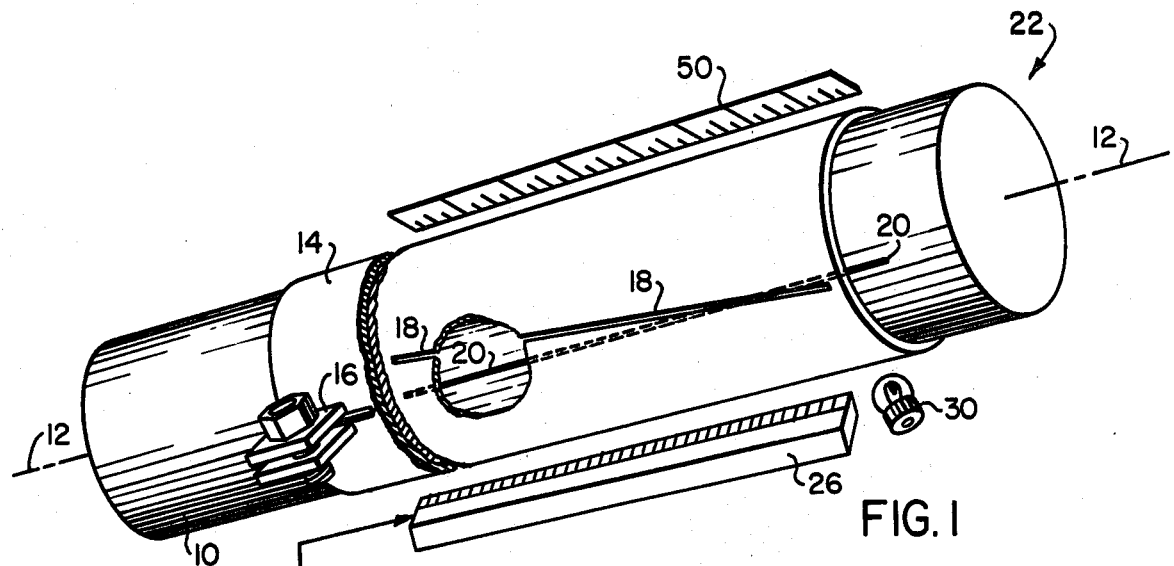
FIG. 1 is a diagramatic pictorial view of a torque meter embodying the invention.

Referring to FIG. 1 there is shown a cylindrical shaft 10, the torque of which is to be measured, and having a shaft axis 12. A cylindrical opaque sleeve 14 is disposed around the shaft and extends along a predetermined length of the shaft. The sleeve has a sliding fit with respect to the shaft and is affixed at one end to the shaft, such as by a clamp 16, to permit twisting of the shaft within the sleeve without twisting of the sleeve itself. An optical aperture in the form of an elongated slit 18 is provided through the wall of sleeve 14, the slit being angularly disposed or skewed with respect to the shaft axis 12. An axial marker 20 is provided on shaft 10 and of a length such that a portion of the marking is visible through aperture 18.

In the illustrated embodiment, the end of the shaft 22 is assumed to be connected to a source of applied torque such as an engine, while the opposite end 24 of shaft 10 is assumed to be coupled to an applied load such as a marine propeller. During rotation of the shaft a twist is developed in the shaft by reason of the applied torque, and the marker 20 visible through aperture 18 will change its position along the axis of the shaft as seen through the aperture by an amount proportional to the amount of torque applied. The marker 20 is of a contrasting color to the surface coloration of shaft 10 and typically can be a black or colored axial line on the shaft surface, which for steel shafts is of shiny silver-like surface appearance. For a rotating shaft, the marker visible through aperture 10 appears as a band of marker color, the band being of a width determined by the particular angular relationship of the aperture 18 to the shaft axis 12.

In the presence of applied torque which causes twisting of the shaft, the marker band as seen through the aperture changes its position axially along the shaft by an amount which is a measure of the amount of torque applied to the shaft. The degree of perceived marker movement can be visually monitored in association with an appropriately calibrated scale 50 to indicate torque measurement.

Axial movement of the shaft marker as seen through the aperture can also be electro-optically sensed to provide an electrical signal indication of torque. An array 26 of photosensors is axially disposed along shaft 10 adjacent to the portion of sleeve 14 containing aperture 18. The sensor array is connected to an output circuit 28 which provides an electrical output signal representative of torque, and which can drive a suitable display 29 operative to numerically denote a torque measurement. A light source 30 provides illumination of the portion of sleeve 14 containing aperture 18, and the photosensor array 26 is operative to sense light reflected from the aperture which will include a band of contrasting reflectance caused by the marker 20. Light received after reflection from the portion of the aperture 18 in which the marker 20 is present is distinguishable from the light received from the other portions of the aperture. The photsensors of array 26 are selectively activated in accordance with the reflected light pattern to provide corresponding electrical signals which are amplified and otherwise processed in well known manner by circuit 28 to provide output signals representative of the position of the marker 20 with respect to aperture 18 and thus an output indication of torque.

The angle of the aperture 18 with respect to the shaft axis 12 determines the magnification of the axial movement of marker 20 in response to twisting movement of the shaft about its axis. For an angle of 1° between aperture 18 and axis 12, a magnification of 57 to 1 is provided for movement of the visible marking. A magnification of 10 to 1 is provided by an aperture angle of 5.7°. Thus, for small angles of twist, a relatively large axial movement of the visual marker is produced for sensing. The particular angular orientation of the aperture is selected to provide an intended degree of magnification of the marker.

Figure 2:
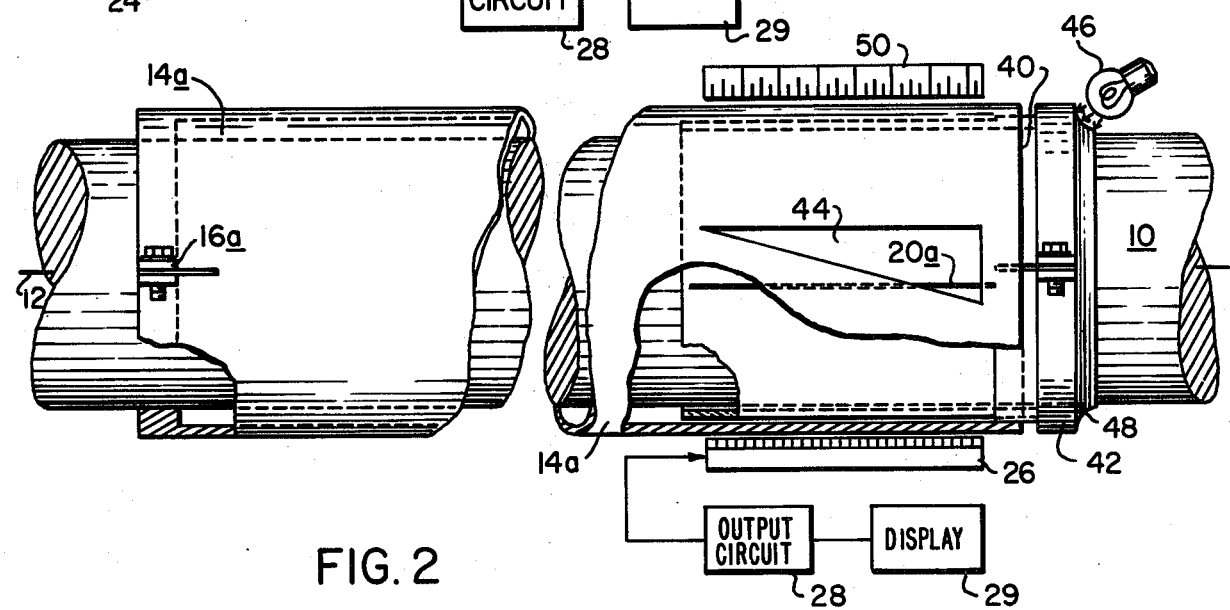
FIG. 2 is a diagramatic view of an alternative embodiment of the invention.

An alternative embodiment of the invention is shown in FIG. 2 and employs a second sleeve clamped to the shaft and slidably disposed within the unclamped end of the first sleeve. This second sleeve has markings thereon which cooperate with an aperture provided in the first sleeve to prove a sensible torque indication. Referring to FIG. 2 there is shown a sleeve 40 which is attached at one end such as by a clamp 42 to shaft 10, this sleeve 40 being slidably disposed within a portion of sleeve 14a which is clamped to shaft 10 as described above. Aperture 44 is provided in sleeve 14a, the aperture in this embodiment being of triangular or wedge shape having a predetermined angular disposition to the shaft axis 12. The sleeve 40 is formed of a light conductive material such as Lexan. A shaft marker 20a is provided on sleeve 40 by means of an axial line or groove in the outer surface of sleeve 40 and from which light introduced into the sleeve is emitted. Light is applied to sleeve 40 by means of a source 46 adapted to illuminate an edge 48 of sleeve 40.

In response to a torque applied to shaft 10, the length of the illuminated marker 20a visible through aperture 44 will depend on the relative circumferential position of the marker in relation to the aperture and thus the visible length of marker 20a provides a measure of torque applied to the shaft. The visible portion of marker 20a will appear as a band of light for a rotating shaft, of a width representative of torque. The width of the illuminated band can be visually read in association with an appropriate scale 50, and can also be sensed by a photosensor array 26 as described above to provide an electrical output signal representative of torque for application to a display 29 or other utilization device.

Figure 3A:
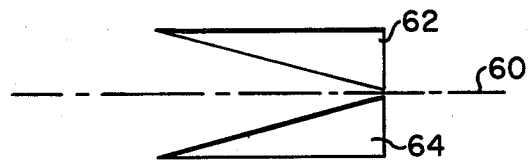
FIGS. 3A and 3B are diagramatic views of alternative aperture configurations useful in the invention.
Figure 3B:
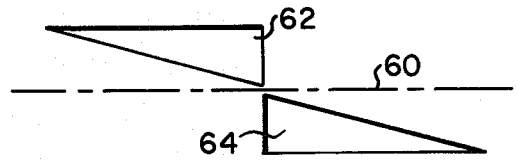

The initial position of the shaft marker in relation to the aperture can be selected to provide an indication of torque applied in either rotational sense. For example, in the embodiment of FIG. 1, the marker 20 can be disposed for sensing at the central portion of aperture 18, with shaft 10 in an untorqued condition. With a clockwise torque applied to shaft end 22, the marker will move leftward in FIG. 1, while with a counterclockwise torque applied to end 22, the marker will move rightward. Alternatively different apertures can be provided to denote torque applied in one sense or opposite sense to the shaft. As shown in FIGS. 3A and 3B, a marker can be aligned along an axis 60 is an untorqued shaft condition, with clockwise torque being sensible through a first aperture 62, and counterclockwise torque being sensible through a second aperture 64.

The novel torque meter is also applicable for use with non-rotary shafts since in the presence of torque applied to a stationary shaft the relative position of the shaft marker and aperture will also change to provide a sensible indication of applied torque in the same manner as described above. Of course for a stationary shaft, it will be appreciated that the marker seen through the aperture is not perceived as a sensible optical band but rather as a linear marking which can be visually or electro-optically sensed. The marker can itself be of various configurations which will result in a magnified axial movement sensible through an associated aperture.

The invention is not to be limited except as indicated in the appended claims:

What is claimed is:

1. A torque meter for providing an indication of the torque applied to a cylindrical shaft comprising:

a single sleeve disposed around a shaft and extending along a predetermined axial length thereof;

means securing one end of said sleeve to said shaft for rotation therewith;

the other end of said sleeve being rotatable with respect to said shaft;

an aperture provided in the wall of said sleeve and extending along the length of the sleeve;

a marker on the surface of said shaft and having a portion visibly sensible through said aperture;

said aperture and said marker being angularly disposed with respect to each other; and electro-optical means for indicating the relative position of the marker visible through said aperture and representative of torque applied to said shaft;

said electro-optical means including means for illuminating said aperture and an elongated photosensor array disposed along said shaft adjacent to and substantially coextensive with said aperture and operative to sense light from said aperture and to provide an electrical signal representative of applied torque.

2. The torque meter of claim 1 wherein said aperture is a linear slit in the wall of said sleeve disposed at a predetermined angle to the axis of said shaft and through which said marker is visibly sensible.

3. The torque meter of claim 1 including a second aperture provided in the wall of said sleeve and circumferentially adjacent to the other aperture and extending along the length of the sleeve, and being of opposite angular disposition to said marker than the other aperture;

said photosensor array being disposed symmetrically with respect to said apertures and operative to sense light from one aperture or the other to provide an electrical signal representative of clockwise or counterclockwise torque respectively.

4. A torque meter for providing an indication of the torque applied to a cylindrical shaft comprising:

a first light transmissive sleeve disposed around a shaft and extending along a predetermined axial length thereof;

means securing said first sleeve to said shaft for rotation therewith;

a second sleeve disposed around said shaft and said first sleeve and extending along a predetermined axial length thereof;

means securing one end of said second sleeve to said shaft for rotation therewith;

the other end of said second sleeve being rotatable with respect to said first sleeve;

an aperture provided in the wall of said second sleeve and extending along the length of said second sleeve;

a marker on the surface of said first sleeve and having a portion visibly sensible through said aperture;

said aperture and said marker being angularly disposed with respect to each other;

means for directing light through said first sleeve to cause emission of light from said marker; and an elongated photosensor array disposed along said shaft adjacent to and substantially coextensive with said aperture and operative to sense light emitted from said marker through said aperture and to provide a signal indication of applied torque.

5. The torque meter of claim 4 wherein said first sleeve is of a light conductive material and said marker is a groove in the surface thereof.

6. The torque meter of claim 4 wherein said first sleeve includes an edge portion through which light is introduced from said light directing means.

* * * * *